United States Patent [19]

Badgett

[11] 3,861,786
[45] Jan. 21, 1975

[54] SYSTEM FOR MOUNTING AN OPTICAL LENS IN A HOLDER FOR LIMITED MOVEMENT ALONG A FIXED AXIS

[75] Inventor: Roger B. Badgett, Elk Grove, Ill.

[73] Assignee: Teletype Corporation, Skokie, Ill.

[22] Filed: May 17, 1973

[21] Appl. No.: 361,375

[52] U.S. Cl. .................... 350/255, 350/245, 350/84
[51] Int. Cl. ........................................... G02b 7/02
[58] Field of Search ........... 350/245, 252, 255, 288, 350/310, 84, 187

[56] References Cited
UNITED STATES PATENTS

| | | | |
|---|---|---|---|
| 2,893,717 | 7/1959 | Simmons | 350/255 |
| 2,908,209 | 10/1959 | Marvin | 350/255 |
| 3,016,464 | 1/1962 | Bailey | 350/255 |
| 3,019,706 | 2/1962 | Ueno | 350/84 |
| 3,391,975 | 7/1968 | Annis et al | 350/255 |
| 3,583,792 | 6/1971 | Jones | 350/255 |
| 3,751,139 | 8/1973 | Malherbe | 350/288 |

*Primary Examiner*—Ronald J. Stern
*Assistant Examiner*—Michael J. Tokar
*Attorney, Agent, or Firm*—J. L. Landis

[57] ABSTRACT

A pair of flexible washers are used to mount a workpiece in a fixed outer holder for precise movement along a fixed axis A. Inner portions of the washers are secured to spaced portions along the workpiece so that the washers project from the workpiece in spaced planes perpendicular to the axis A. Outer portions of the washers are clamped in the holder so that they cannot move. The inner portions of the washers are free to move with the workpiece, so that this mounting permits limited movement of the workpiece precisely along the fixed axis A. The system is particularly advantageous in positioning of optical lenses such as are used in focusing a laser beam on a substrate, where the position of the lens must be adjusted to follow the surface of the substrate.

8 Claims, 7 Drawing Figures

PATENTED JAN 21 1975 3,861,786

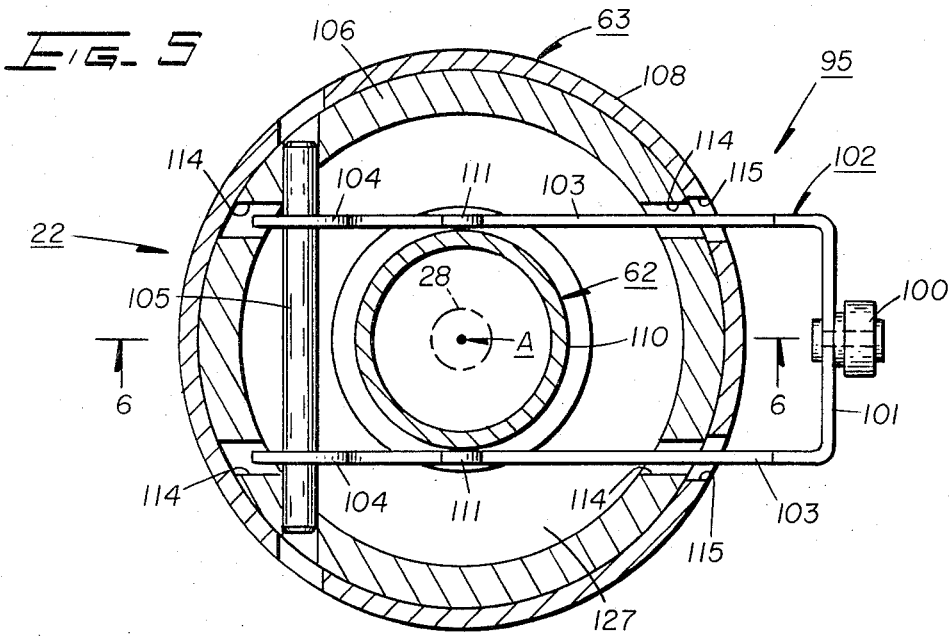
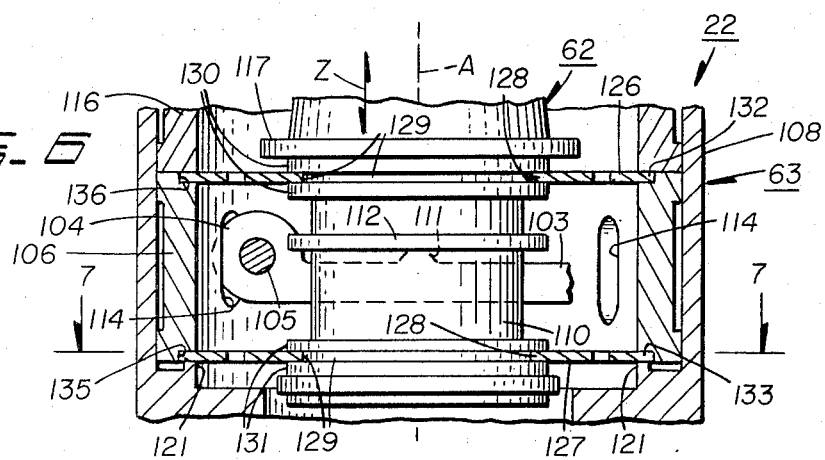

3,861,786

SYSTEM FOR MOUNTING AN OPTICAL LENS IN A HOLDER FOR LIMITED MOVEMENT ALONG A FIXED AXIS

INTRODUCTION AND BACKGROUND

This invention relates generally to precise mounting of a workpiece for limited movement along a fixed axis, and particularly to positioning an optical lens such as is used in focusing a laser beam on the surface of a moving substrate.

While the invention has general utility for many applications, it is especially useful in various processes for recording information or data on a nonconductive recording surface using an energy beam such as a laser, wherein extremely precise positioning of the energy beam with respect to the surface is desired. One particular process in which the invention can very profitably be used is a "laser writing," or recording process used to generate a memory by localized melting of selected areas along recording tracks in the surface of a thermoplastic film. Such a process may be generally as disclosed in commonly assigned copending applications of Leonard A. Nash, Ser. No. 349,132, filed Apr. 9, 1973 (now U.S. Pat. No. 3,815,146, issued June 4, 1974), and Donald C. Landwer, Ser. No. 361,376, filed on the same day as this application.

In such a process, the laser beam is selectively focused on the surface of a moving film to "write," and thereby generates minute melted depressions in the surface of the film, which can later be read out by a laser reading process such as is described in the Landwer application.

In this and other beam-recording processes, it is advantageous to use a rotary disc as the record member, with a movable recording arm, such that the recording process generates a set of concentric circular tracks, or a spiral track in the record surface generally analagous to the process used in making phonograph records. The rotary disc approach to recording is very attractive, in that the recording process is very simple, a large amount of information can be recorded in a relatively small area, and playback or read out is relatively simple.

It is important to provide a system for positioning a focusing lens of the laser unit with respect to the writing surface, so that the focal plane of the lens always coincides with the writing surface. As described in the Landwer application, this positioning is preferably accomplished by sensing the capacitance between an electrode physically connected to the focusing lens and a layer of conductive material underlying a nonconductive film on which the beam operates. The capacitance sensor then feeds back a signal to a servomechanism for adjusting the position of the lens, so that the focal plane of the lens always coincides with the surface of the film.

SUMMARY OF THE INVENTION

A specific object of this invention is to provide an improved system for precise mounting of a workpiece, such as an optical lens, for limited movement along a fixed axis, particularly a system useful in combination with the capacitance sensing system of the Landwer application to position a laser beam on a thermoplastic film for data storage and read out.

With the foregoing and other objects in view, a system in accordance with the invention is designed to mount a workpiece within a holder for limited movement along an axis A. The mounting includes a pair of flexible washers having inner portions secured to spaced portions of the workpiece and projecting from the workpiece in spaced planes perpendicular to the axis A. Outer portions of the washers are clamped in the holder so that the outer portions are fixed against movement. With this arrangement, the inner portions of the washers are free to move with the workpiece so as to permit limited movement of the workpiece precisely along the fixed axis A.

Preferably, the washers are thin metal discs having circular outer peripheries, and central bores of a size to fit about the spaced portions of the workpiece. The clamping mechanism preferably includes a pair of mounting rings which can be stacked in an outer holder and which have portions shaped to fit and center the washers in the outer holder. The rings are pressed together to seat the washers securely in the holder, and then are clamped in place with a spring clip. A spring is placed between one of the rings and the workpiece to urge the workpiece in one direction within the holder, and a cam-following lever bears against a portion of the workpiece from the opposite side to position the workpiece in the holder.

Other objects, advantages and features of the invention will appear from the following detailed description of a specific embodiment thereof, when taken in conjunction with the appended drawings.

DRAWINGS

In the drawings,

FIG. 5 is an enlarged horizontal section along line 5—5 of FIG. 4.

FIG. 6 is a fragmentary section along line 6—6 of FIG. 5, showing the mounting mechanism for the lens housing.

FIG. 7 is a horizontal section along line 7—7 of FIG. 6, illustrating one of a pair of flexible washers used to mount the lens housing.

DETAILED DESCRIPTION

BACKGROUND — RECORDING AND REPRODUCING PROCESS

Figure 1:
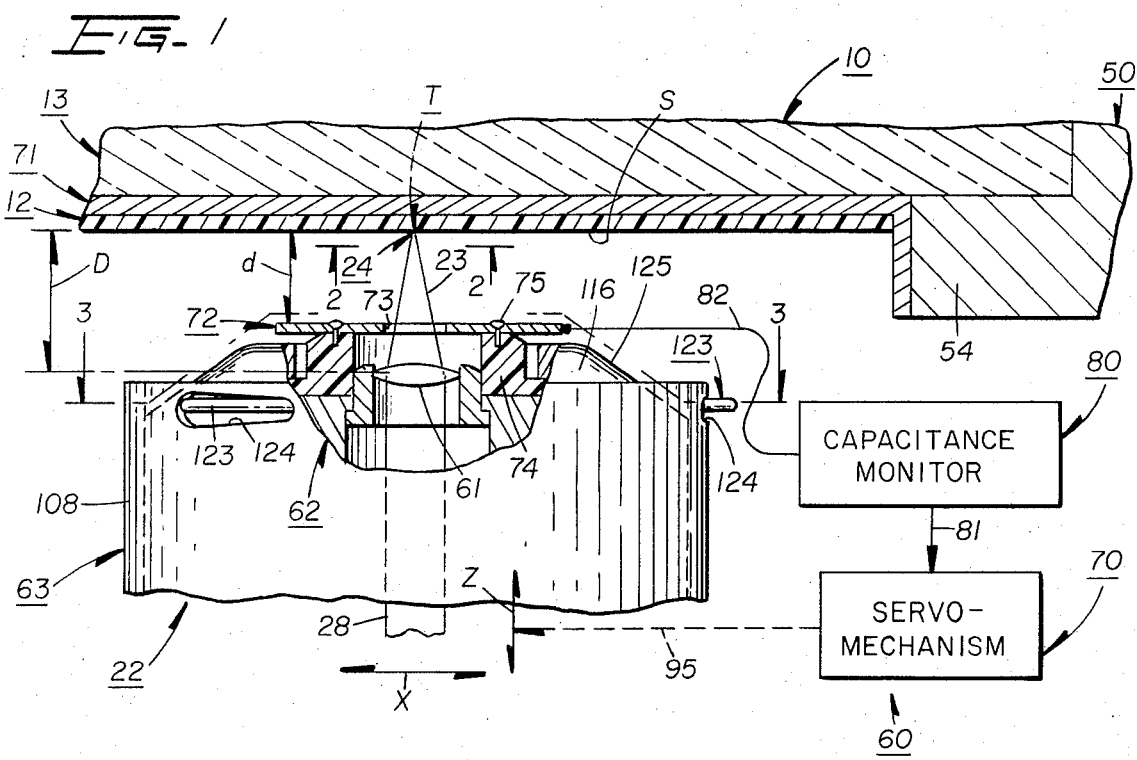
FIG. 1 is a partially schematic, vertical section of a portion of a laser-recording system, using a lens-positioning arrangement according to the invention, with certain vertical dimensions exaggerated for illustrative purposes.
Figure 2:
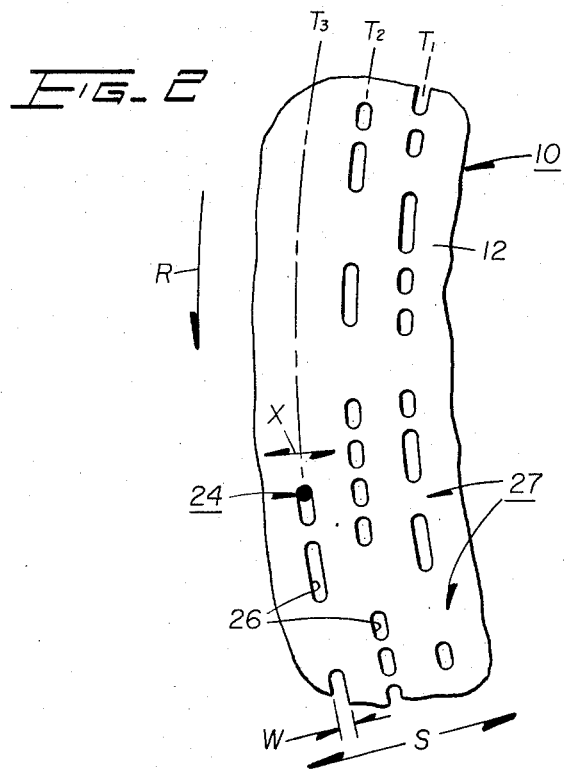
FIG. 2 is a greatly enlarged, fragmentary view of a portion of a recording, taken generally along the line 2—2 of FIG. 1.

Referring to the drawings, FIGS. 1 and 2 illustrate the general principles of the recording and reproducing processes described in more detail in the Nash and Landwer applications. In the process, a record 10 is mounted on a turntable (not shown) in accordance with the Nash application and is rotated for example in the direction of arrow R in FIG. 2. The record 10 includes a thin thermoplastic film 12, such as an acrylic resin, applied to the under surface of a backing disc or substrate 13 of a flat high melting point material, such as glass.

A recording arm 21 (FIGS. 3 and 4) is mounted below the record 10, generally similar in arrangement to a standard phonograph recording arm. The arm 21 carries a lens assembly 22 for projecting a focused laser beam 23 on a small spot 24 on the surface of the thermoplastic film 12. When recording, the laser beam is either focused or not focused on the film 12, depending on the data to be recorded, or effectively is turned "on" and "off" as far as recording is concerned. This causes localized melting of the surface of the film 12 to form depressions or grooves such as 26 (FIG. 2) in the surface of the moving film 12 whenever the beam 23 has turned "on" to record. When off, untouched areas or lands 27 are left between the grooves 26. An input laser beam 28 is applied to the lens assembly 22, for focusing on the recording spot 24 when groooves 26 are to be formed.

The lens assembly 22 and recording arm 21 are mounted for lateral movement (arrow X) with respect to the recording surface (S) as in phonograph recording, so as to permit exposure of the focused beam 23 to various desired areas or recording spots on the record. As described in the Nash and Landwer applications, it is preferred to utilize a conventional stepping motor to move the lens assembly 22 along the surface to any of various preselected positions so as to form a plurality of concentric circular recording tracks, three of which are designated as $T_1$, $T_2$, $T_3$, in FIG. 2. In practice the lens assembly 22 and thus the focused beam 23 can be aligned with any selected one of several thousand recording tracks which can be formed along the recording surface, first to record, and then later to read out the recorded message.

To read out previously recorded information, the record 10 is preferably remounted on the turntable, a desired channel or track T is selected by the stepping motor, and then a "reading," or nondestructive laser beam, similar in position to the beam 23, is applied to the rotating record 10 by the same lens assembly 22. The amount of light energy of the reading beam reflected back to the lens assembly 22 differs sufficiently, based on whether a groove 26 or a land 27 is present at any time, that this difference can be sensed by conventional means and converted into a binary data signal corresponding to the recorded data, in a known fashion.

The record 10 is mounted on the turntable as nearly as possible in an exact and precisely repeatable horizontal plane. To provide a flat mounting, the record substrate 13 is mounted on a central metallic hub 50, as by cementing on an annular shoulder 54 at the outer edge of the hub 50, so as to mount the disc 13 as nearly as possible flat and parallel to the surface of the hub 50. The hub 50 in turn, is mounted on the turntable 11 as described in the Nash application, to provide a very precise positioning of the record 10 with the under or recording surface S of the record as nearly horizontal as possible, and as nearly as possible in a fixed, repeatable horizontal recording plane bearing a fixed, predetermined vertical spacing between the record 10 and the recording arm 21.

As described in the Landwer application, a system 60 is provided for positioning the focused beam 23 precisely on the recording surface S at all times in the recording and read out processes, as the record 10 rotates and the recording arm 21 and lens assembly 22 step or traverse to positions aligned with any and all possible recording locations in the recording surface S. In FIG. 1, a single focusing lens 61 is shown for purposes of illustration having a focal plane or focus distance "D," which is defined as the distance between the center of the lens 61 and the tip of the focused beam 23. In the actual lens assembly used, the focusing is done by a vertically stacked array of three lenses, which in sequence properly focus the input beam 28 at the desired distance D. In one typical example, the focus distance D is chosen as 0.16 millimeters, which provides for good recording and read out in the process described, using a relatively low powered laser. For the purposes of description of this invention, the uppermost lens 61 illustrated will be regarded as equivalent to the actual array of three lenses.

In the specific example, the lenses constituting the equivalent lens 61, and other optical components used in the process, are mounted in a lens housing 62 comprising a cylindrical metal tube, as is customary in the optical art. The lens housing 62 is movable in a vertical direction according to arrow Z in FIG. 1, within a fixed outer support assembly, or holder 63, of the lens assembly 22. The lens housing 62 is so moved to position the lens 61 by a servomechanism 70 described herafter.

Thus, in the partially schematic illustration in FIG. 1, the positioning system 60 is designed to adjust the instantaneous vertical position of the lens housing 62 so that the focal plane of the lens 61 is always coincident with the recording surface S, despite irregularities in flatness or slight warpage of the substrate 13, or other process vagaries that might alter the instantaneous horizontal position of the spot 24 being recorded or read out at any time. For example, as the record 10 rotates, the manufacturing process variations may cause the outer edge of the record 10 to rise and fall by as much as ± 0.007 inch. The positioning system 60 is designed so that lens 61 will follow this motion within ± 0.0005 inch.

In order to continuously monitor the focus distance D, the recording disc 13 is provided with a thin electrically conductive layer or coating 71, preferably of silver, copper or aluminum, covering the entire under surface of the glass mounting disc or substrate 13 and in electrical contact with the central hub 50. Alternatively, a metal substrate such as aluminum can be used.

As further described in the Landwer application, the positioning system 60 also includes an electrode 72 (FIGS. 1 and 3) physically connected to the lens housing 62, and positioned in non-contacting proximity to the recording surface S of the film 12. Preferably, the electrode 72 is a thin, flat, conductive metal ring, having a circular central hole 73 concentrically mounted with respect to the lens 61 and the focused beam 23, and projecting from the lens housing 62 toward the recording surface S as shown in FIG. 1. In the embodiment illustrated, the electrode 72 is mounted to the lens housing by securing the electrode lens on top of an electrically insulating plastic supporting cylinder or collar 74, as by rivets 75 or adhesive bonding. The collar 74 in turn is detachably secured in the desired position atop the cylindrical lens housing 62, as by a force fit or a threaded connection.

In practice, it is desirable to position the electrode 72 sufficiently close to the recording surface S (distance

*d* in FIG. 1) to obtain a useful range of capacitance to the metal coating 71, but without running the risk of ever contacting the surface S physically under any circumstances. In one working example, the distance *d* from the electrode 72 to the surface S is set in the range of 10-15 thousandths of an inch. (As previously noted, the vertical dimensions of the record materials and lens spacing in FIG. 1 are greatly exaggerated to illustrate the principles of operation.)

Since the electrode 72 is fixed to the lens housing 62, and since the focal plane of the lens 61 is fixed in operation, one can exactly set the focus distance D of the lens 61 by setting the electrode-to-surface distance *d*. This is done by connecting the conductive film 71 and the electrode 72, to a capacitance-measuring circuit or monitor 80, which continuously monitors the instantaneous capacitance between the electrode 72 and the recording spot aligned with the conductive film 71. In essence, the monitor 80 senses instantaneous deviations in the circuit capacitance from a reference capacitance preset for proper focus, and transmits a differential output 81 to the servomechanism 70 for adjusting the position of the lens housing 62 in the Z direction to correct the focal plane so that it coincides precisely with the recording surface S at all times. The servomechanism 70 includes a conventional, reversible electrical servomotor 93 (FIG. 4) and a mechanical linkage 95 in accordance with the principles of this application, for raising and lowering the lens housing 62 in response to the monitor 80 output.

LENS — POSITIONING MECHANISM 95

Figure 3:
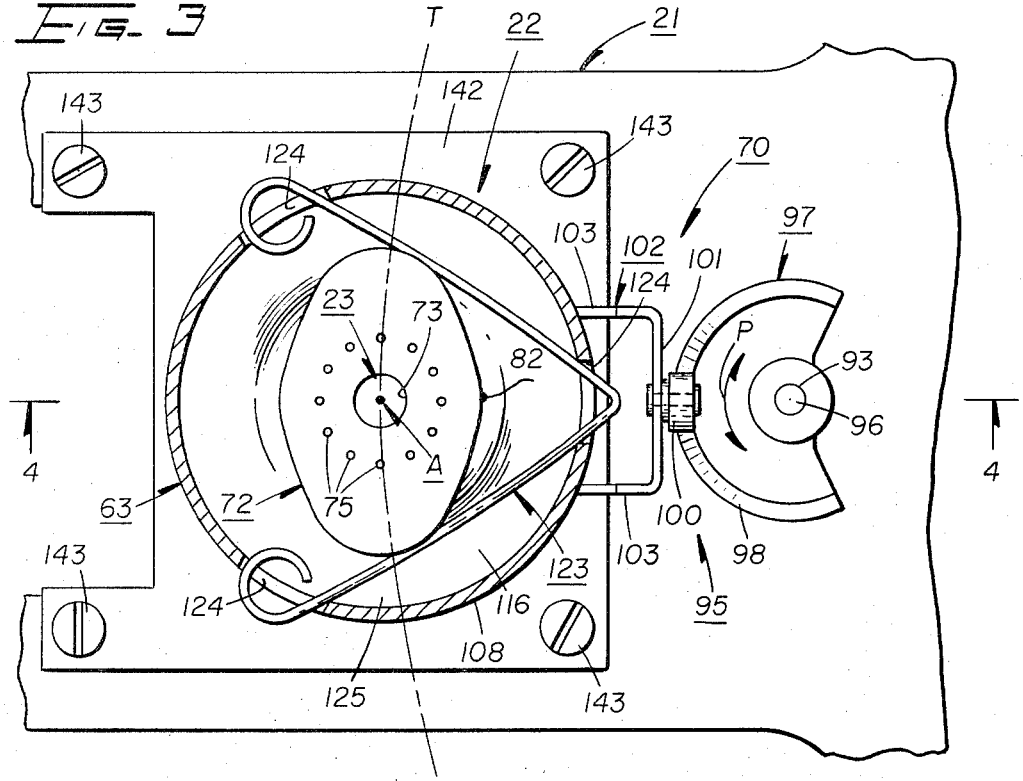
FIG. 3 is a top view of the lens assembly and positioning system, partly in section along line 3—3 of FIG. 2.
Figure 4:
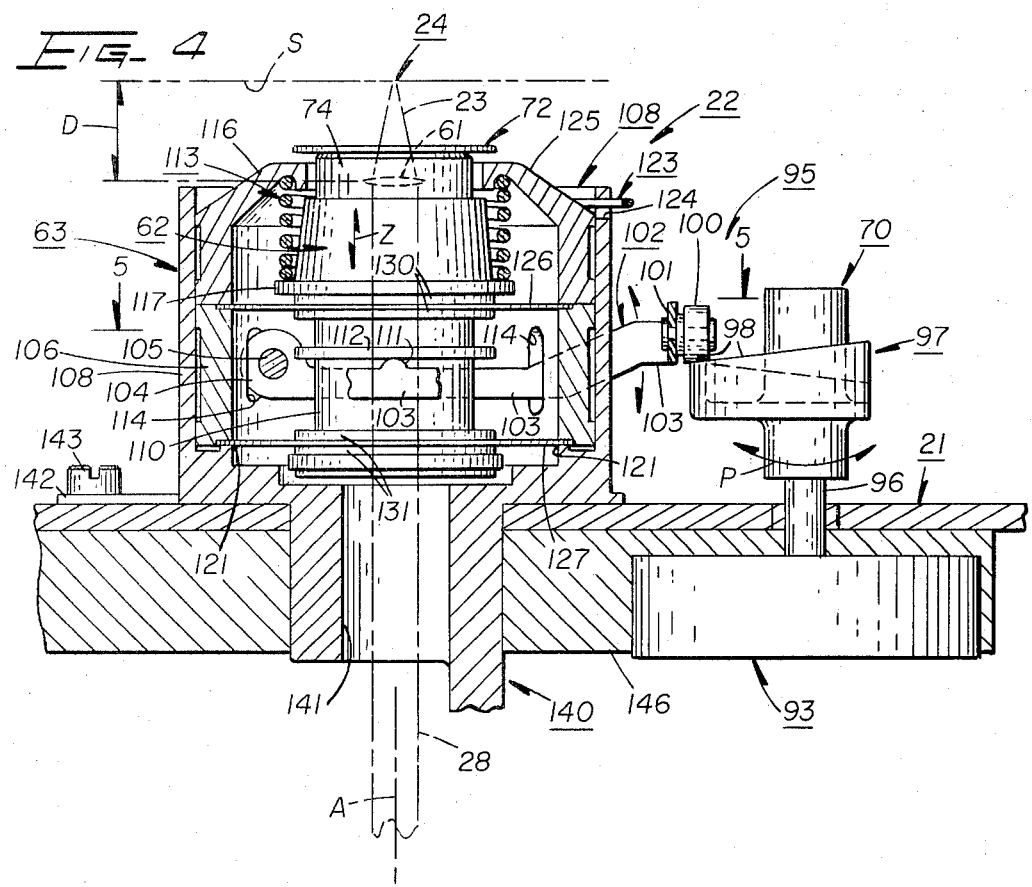
FIG. 4 is a vertical section through the lens assembly, taken generally along the line 4—4 of FIG. 3 and corresponding in part to FIG. 1.

Referring now to FIGS. 3-7, this invention relates to the mechanism 95 for precise mounting and positioning of a workpiece, such as the optical lens 61, along a fixed axis such as the lens axis A in FIGS. 3-4. As used in the laser-recording process constituting the preferred embodiment of the invention, described in the preceding section, the positioning mechanism 95 responds to the output of the capacitance monitor 80 (FIG. 1), and consequent rotation of the servomotor 93 (FIG. 4) so as to raise or lower the lens housing 62 within the fixed outer holder 63 prescribed distances in the vertical direction Z so as to always maintain the focal plane of the lens 61 coincident with the recording surface S.

The object is to so position the lens 61, while always maintaining the vertical movement exactly coincident with the lens axis A so that the focused beam 23 never varies in a horizontal, or lateral direction; thus so that the spot 24 on the recording surface hit by the tip of the beam 23 is always coincident with the selected track $T_1$, $T_2$, etc. This is particularly important on read-out, to realign the beam as often as reading is desired exactly with a track previously recorded and to keep the beam aligned even though the lens 61 has to move up and down to accommodate microvagaries in the position of the recording surface. Since the width W (FIG. 2) of the recorded grooves 26 is typically 0.0002 inch, it should be apparent that close to 100 percent precise positioning of the beam is desirable in the lateral direction X in FIGS. 1 and 2. During recording, this positioning is equally important, so as to permit recording in a perfect circular track, such as $T_1$, with virtually zero ellipticity such that the beam 23 can follow the track exactly on read out.

In the specific embodiment illustrated, the motor 93 is a generally conventional servomotor, such as a linear torque motor, capable of rotating a shaft 96 and a cam 97 mounted on the shaft (arrow P in FIG. 3) through angles of plus or minus approximately 60 degrees from a central position illustrated in FIG. 3. The cam 97 is a segmented cylindrical cam having an upwardly spiraling horizontal camming surface or track 98 on which a conventional cam-following roller 100 rides, so as to reciprocate vertically upon rotation of the cam 97 with a total throw of approximately 0.020 inch. This permits maximum up and down movement of the lens 61 of approximately ± 0.010 inch, in the process, in response to recording-surface deviations.

The cam roller 100 is rotatably mounted, as shown in FIGS. 4 and 5, on a crossarm 101 of a generally square-U-shaped bail 102, having parallel side arms 103—103. As illustrated in FIG. 4, the side arms 103 are generally horizontal when the system is in balance at the midpoint of the cam 97, but the bail 102 is free to pivot about the outer ends 104—104 of the side arms 103 in response to movement of the cam 97. For this purpose, the outer ends 104 of the bail 102 are freely pivotable on a pivot pin 105, which is mounted in a horizontal position, as illustrated, in a lower mounting ring 106 or sleeve comprising an inner part of the fixed holder 63 for the lens housing 62. As will be described in more detail hereafter, the lower mounting ring 106 fits slidably and closely within a cylindrical bore in a fixed outer support member 108, having an upstanding tubular portion for receiving the mounting ring 106 and other elements making up the fixed outer holder 63.

As best seen in FIG. 5, the side arms 103 of the bail 102 straddle a lower central cylindrical section 110 of the lens housing 62. The upper surfaces of the bail arms 103 are formed with rounded projections 111—111 on opposite sides of the section 110 and in horizontal alignment with the center of the lens assembly 22.

As seen in FIG. 4, a circular flange 112 is formed around the lens housing 62 at the top of the section 110, and the entire lens housing 62 is continuously urged downward against the bail projections 111 by a coil spring 113, as will be described. Thus, the spring 113 biases the bail 102 clockwise downward about the pivot pin 105, and so causes the cam roller 100 to follow the cam 97 in well-known fashion. As the cam 97 rotates in the direction (clockwise, FIG. 3) to lift the roller 100, and thus pivot the bail 102 counterclockwise, the bail projections 111 bear against the flange 112 and raise the lens housing 62 against the action of the biasing spring 113 so as to elevate the lens 61 in accordance with the cam setting. When the cam 97 turns the opposite direction (counterclockwise, FIG. 3), the spring 113 forces the lens housing 62 downward to follow the cam 97 so as to lower the lens 61, as dictated by the cam 97. The bail arms 103—103 are received in aligned slots 114—114 and 115—115 in the mounting ring 106 and outer support 108, as illustrated in FIGS. 4 and 5, to permit the required pivoting movement of the bail 102.

The spring 113 is positioned between a fixed upper mounting or support ring 116, or pressure cap, of the support assembly 63 and an upper circular flange 117 on the lens housing 62 so as to urge the lens housing 62 downward within the fixed mounting assembly 63. The upper support ring 116 is mounted atop the lower support ring 106 in the aligned position shown in FIG. 4.

Prior to any recording or reproducing operations, the complete lens assembly 22 is put together as shown in FIG. 4, with the support rings 106 and 116 being placed about the lens housing 62 and inside the outer cylindrical support 108 to form the outer holder assembly 63. The lower ring 106 is supported on an inwardly projecting annular ledge 121 (FIG. 6) near the base of the support member 108, and the upper ring 116 is placed atop the lower ring 106. The upper ring 116 is next pushed manually downward to compress the spring 113 and thus firmly seat the lens housing 62 within the rings 106 and 116, and a V-shaped spring clip 123 is then threaded through a set of three apertures 124 in the walls of the holder 63 near the top thereof to hold the upper ring 116 in the depressed position, as shown in FIGS. 3 and 4. The clip 123 bears against a slanted upper surface 125 of the upper ring 116, so as to lock the rings 116 and 106 in the fixed positions shown within the outer support 108.

While the compressed spring 113 attempts to force the upper ring 116 upward, the upper walls of the apertures 124 prevent any upward movement beyond the point where the clip 123 is stopped by the walls of the apertures 124 as shown in FIGS. 1 and 4. As shown in FIG. 3, the ends of the clip 123 are curved in a circle to fit in the left two apertures 124 in FIG. 3, thus permitting the clip 123 to be slightly bent for insertion, but to then snap back to the stable, locking position shown in FIG. 3. The combination of the upper ring 116 and spring clip 123 thus serves as a pressure cap to hold the inner support rings 106 and 116 of the holder assembly 63 firmly in place and fixed against vertical movement. This provides a firm outer support or cylindrical holder, within which the lens housing 62 is mounted for the limited vertical movement required to adjust the lens position as previously described.

Mounting Assembly

The required limited reciprocable mounting of the lens housing 62 inside the fixed holder assembly 63 is accomplished by the use of a pair of spring steel washers 126 and 127, the inner portions of which are mounted to portions of the lens housing 62 for vertical movement therewith. As best illustrated in FIGS. 6 and 7, the inner circular edge 128 of each washer 126 and 127 is received within a close-fitting square peripheral groove 129 formed in a pair of flanges 130 and 131 located at the opposite ends of and defining the ends of the lower central section 110 of the housing 62. With this arrangement, the washers 126 and 127, being springy, can readily be snapped over the respective flanges 130 and 131, upon initial assembly with the housing 62, so that the inner circular edges 128 are captured in the grooves 129. Thus, the lens housing 62 and the inner edges 128 of the washers 126 and 127 are thereafter constrained to travel vertically (Z direction) as a unit.

However, the outer circular edges 132 and 133 of the washers 126 and 127 are firmly clamped in the outer holder assembly 63, so that they cannot move. In particular, the outer annular edge 133 of the lower washer 127 is initially seated on the annular ledge 121 at the base of the outer support member 108. The lower mounting ring 106 is thereafter placed over the body of the lens housing 62 so that the outer edge 133 of the washer is received in a stepped annular groove 135 at the base of the ring 106, which serves to center the lens housing 62 within the holder assembly 63. Correspondingly, the outer edge 132 of the upper washer 126 is seated in a similar annular groove 136 at the top of the lower ring 106, as shown in FIG. 6. When the upper support ring 106 is then placed on top and forced downward by the spring clip 123, the outer edges of both washers 126 and 127 are thereafter clamped in the outer holder assembly 63 when the spring clip 123 is put in place, and both washers 126 and 127 are precisely centered about the lens axis A by the stepped grooves 135 and 136 of the lower ring 116.

This axially aligned mounting of the two support washers 126-127 necessarily centers the lens housing 62 carried thereby, precisely within the holder assembly 63. The washers 126 and 127 permit the lens assembly 62 to be reciprocated limited distances vertically along the lens axis A by the cam 97 and bail 102. The washers 126 and 127 are sufficiently thin and flexible that they can flex or bend about their outer edge mountings sufficiently to permit the vertical travel of the lens assembly 62 required by the cam 97. Preferably, the washers 126 and 127 are formed with a series of elongated curved holes or slots 138 therethrough so as to enhance the flexibility of the washers as the lens housing 62 moves. The pattern of slots 138 in the upper washer 126 is the opposite of that shown in FIG. 7 for the lower washer 127. In one example, the washers are of shim steel approximately 1.6 inches outside diameter, 0.8 inch inside diameter, and 0.0125 inch thick, with the very pronounced slotted areas as shown in FIG. 7. Such a mounting can readily flex permitting the workpiece, such as the lens housing 62, carried at the center a total vertical travel of ± approximately 0.020 inch, while maintaining the axis A of travel A essentially constant, with no measurable deviation in any lateral direction.

As illustrated in FIG. 4, the outer support member 108 has a depending cylindrical portion 140, with a central bore 141 for entry of the input laser beam 28. The support 108 also has a flat, generally rectangular flange 142 at the base of the lens assembly 22, which is secured to the recording arm 21, as by screws 143, so as to position the entire lens assembly 22 on the recording arm 21 in the desired position for recording and reading out of information. A housing 146 is further secured to the under surface of the recording arm 21, for receiving the servomotor 93, capacitance monitor 80, and other equipment used in the process. With this arrangement, the entire positioning system 60 is mounted on the recording arm 21 for tracking movement therewith to any position along the recording surface S, as previously explained and as described in the Nash and Landwer applications.

From the foregoing description, it should be apparent that there has been provided a simple and effective lens-mounting and positioning system, responsive to instantaneous variations in the position of the recording surface S to automatically and quickly reset the proper focus distance along a precise vertical axis A. The system is sensitive to variations of the order of 0.0005 inch, when recording or reading with a beam of the type described. The sensor, further, is as accurate on read out as in writing, which is very important in the proposed use of the recording system. This ability to precisely position the lens 22 at all times, free from lateral deviations, allows the mechanical requirements for the record 10 to be considerably relaxed, which greatly reduces the manufacturing cost. Also, the mechanical portions of the positioning system 60 are sufficiently compact and light in weight that they can be mounted on the recording arm 21, which is a great advantage in that separate consoles are not required and the lens position can readily be adjusted on the fly.

While one specific embodiment and usage of the invention has been described in detail above, it will be obvious that various modifications may be made from the specific details, steps and uses described, without departing from the spirit and scope of the invention. In particular, while the invention is especially useful in positioning an optical lens in a laser writing process, it may readily be used in many other applications where a precise mounting of a workpiece for limited movement along a fixed axis is desired.

What is claimed is:

1. In combination with an apparatus for mounting an optical lens for limited movement along a fixed lens axis A, of the type having a cylindrical lens housing defining the axis A; a fixed outer support member having a cylindrical bore, within which the lens housing is concentrically mounted; a pair of spaced, parallel, flexible washers for mounting the lens housing concentrically in the support member, the washers having inner portions fixed to spaced portions of the lens housing so that the inner portions of the washers are constrained to follow movement of the lens housing along the A axis; means for securing outer edges of the washers within the support member; and means engaging portions of the lens housing for moving the housing limited distances along the A axis, the flexible mounting washers preventing lateral travel of the lens housing during such movement; an improved mounting and positioning mechanism characterized in that:

A. the outer support member is mounted vertically and is formed with an inwardly projecting annular ledge near its base for receiving and supporting outer portions of the periphery of a first one of the washers; and
   B. the means for securing comprises a lower mounting ring fitting slidably and closely within the bore of the outer support member above the ledge, the lower mounting ring having a bottom surface shaped to engage outer peripheral portions of the first washer and to urge those portions against the ledge of the support member, the lower ring also having an upper surface shaped to receive and support outer portions of the periphery of the second washer thereon, an upper mounting ring fitting slidably and closely within the bore of the outer support member above the first ring and having a bottom surface shaped to engage outer peripheral portions of the second washer and to urge those portions against the upper supporting surface of the first ring, and means for pressing the upper ring downward to force both rings toward the ledge so that both washers are detachably clamped within the outer support member by the rings.

2. Apparatus as recited in claim 1, wherein the pressing means includes a spring clip mounted in the outer support member and engaging slanted upper surfaces of the upper ring to lock the rings in fixed positions within the outer support.

3. Apparatus as recited in claim 2, wherein the pressing means further includes a coil spring mounted between portions of the upper ring and portions of the lens housing for urging the housing downward within the support member so that portions of the lens housing are biased into engagement with portions of the moving means for the lens housing.

4. Apparatus as recited in claim 3, wherein the moving means for the lens housing comprises:
   a pivoted link having portions engaging portions of the lens housing from the side opposite to the spring, the spring urging the housing into engagement with the portions of the link, and a cam for pivoting the link so as to set the position of the housing.

5. Apparatus as recited in claim 1, wherein the means for moving the lens housing comprises:
   a U-shaped bail having arms spaced to closely straddle portions of the lens housing;
   means for pivotably mounting one end of the bail within the outer support member so that the other end protrudes from the holder for arcuate movement up and down with respect thereto, the lower ring and outer support member having slots for receiving the arms of the bail and permitting such pivoting movement, the bail having portions formed along the upper ends of the arms engaging portions of the lens housing so as to elevate the lens housing on upward movement of the bail;
   means for biasing the lens housing downward against the bail so that the housing follows downward pivoting movement of the bail; and
   means for pivoting the outer end of the bail up and down to adjust the position of the lens.

6. Apparatus as recited in claim 5, in combination with beam-recording apparatus comprising:
   a recording arm mounted for lateral movement with respect to a rotating disc record to select specific recording tracks in a recording surface of the record; and
   means for securing the outer support member of the lens assembly on the recording arm so that the lens faces the recording surface, is centered on axis A, and is initially spaced from the recording surface a preset nominal recording distance therefrom;
   and wherein the means for pivoting the outer end of the bail comprises:
   a motor mounted on the recording arm;
   a rotary cam driven by the motor; and
   a cam follower mounted on the outer end of the bail and responsive to movement of the cam for adjusting the focus of the lens on the recording surface.

7. In combination with an apparatus for mounting an optical lens for limited movement along a fixed lens axis A, of the type having a cylindrical lens housing defining the axis A, a fixed outer support member having a cylindrical bore, means for mounting the lens housing concentrically in the support member for movement along the A axis, and means engaging portions of the lens housing for moving the housing limited distances along the A axis to focus the lens, an improved positioning mechanism characterized in that:
   A. the outer support member and lens housing are mounted vertically;
   B. the means for moving the lens housing comprises:
      a U-shaped bail having arms spaced to closely straddle portions of the lens housing;
      means for pivotably mounting one end of the bail within the outer support member so that the other end protrudes from the holder for arcuate movement up and down with respect thereto, the outer support member having slots for receiving the arms of the bail and permitting such pivoting movement, the bail having portions formed along the upper ends of the arms engaging portions of the lens housing so as to elevate the lens housing on upward movement of the bail;

means in the support member for biasing the lens housing downward against the bail so that the housing follows downward pivoting movement of the bail; and means for pivoting the outer end of the bail up and down to focus the lens.

8. Apparatus as recited in claim 7, in combination with beam-recording apparatus comprising:

a recording arm mounted for lateral movement with respect to a rotating disc record to select specific recording tracks in a recording surface of the record; and mean for securing the outer support member of the lens assembly on the recording arm so that the lens faces the recording surface, is centered on axis A, and is initially spaced from the recording surface a preset nominal recording distance therefrom;

and wherein the means for pivoting the outer end of the bail comprises:

a motor mounted on the recordng arm;

a rotary cam driven by the motor; and a cam follower mounted on the outer end of the bail and responsive to movement of the cam for adjusting the focus of the lens on the recording surface.

* * * * *